United States Patent
Yamamura et al.

(10) Patent No.: US 7,063,908 B2
(45) Date of Patent: Jun. 20, 2006

(54) COMPLEX OXIDES, OXIDE-ION CONDUCTORS, OXIDE-ION CONDUCTING FILMS AND ELECTROCHEMICAL CELLS

(75) Inventors: Yoshihiko Yamamura, Nagoya (JP); Kazuyuki Kaigawa, Nishi-Kasugai-Gun (JP); Shinji Kawasaki, Nagoya (JP); Hiroaki Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 607 days.

(21) Appl. No.: 10/255,226

(22) Filed: Sep. 26, 2002

(65) Prior Publication Data
US 2003/0068553 A1 Apr. 10, 2003

(30) Foreign Application Priority Data

Sep. 28, 2001 (JP) ............................ P2001-299268
Dec. 13, 2001 (JP) ............................ P2001-379657
Jul. 30, 2002 (JP) ............................ P2002-220626

(51) Int. Cl.
*H01M 81/00* (2006.01)

(52) U.S. Cl. ............................ 429/33; 429/30; 429/40; 429/41; 429/304; 429/305; 252/509; 252/519.1; 252/521.1; 252/521.2; 204/291; 204/295; 501/123; 501/126; 501/152; 96/4; 96/6; 423/594.1; 423/594.5

(58) Field of Classification Search ................ 429/33, 429/40, 41, 44, 304, 305, 30; 252/519.1, 252/521.1, 521.2, 509; 204/291, 295; 501/123, 501/126, 152; 96/4, 6; 423/594.1, 594.5
See application file for complete search history.

(56) References Cited

U.S. PATENT DOCUMENTS 6,090,500 A * 7/2000 Ishihara et al. ............... 429/33

FOREIGN PATENT DOCUMENTS

| JP | 11-335164 | 7/1999 |
| JP | 2001-176518 | 6/2001 |

OTHER PUBLICATIONS

Jens Ranlev. "Perovskite-Type Metal Oxides, Electrical Conductivity and Structure," Risø-R-796(EN), Jan. 1995pp. 84-107.
Matsuda, hideaki et al: "Oxygen ion conductivity of doped rare-earth aluminum oxide (LnA 103) perovskite oxides", Proceedings-Electrochemical Society (1993), 93-4 (Proceedings of the Third International Symposium on Solid Oxide Fuel Cells, 1993), 129-36 XP 001155596, pp. 129-131 (first paragraph) *figure 1*.
Patent Abstracts of Japan, vol. 2000, No. 3, Mar. 30, 2000 & JP 11 335164 A (Takita Yusaku; Ishihara Tatsuki; Mitsubishi Materials Corp), Dec. 7, 1999 *Abstract*.
Ranloev, Jens: "Perovskite-type metal oxides. Electrical conductivity and structure", Risoe National Laboratory Report! Risoe-R (1995), Risoe-R-796, 131 PP. (pp. 84-107) XP009019616 *p. 91*.

* cited by examiner

*Primary Examiner*—Bruce F. Bell

(74) *Attorney, Agent, or Firm*—Burr & Brown

(57) ABSTRACT

A complex oxide and an oxide-ion conductor made of the complex oxide are provided. The complex oxide has a basic composition of $(Sm_{1-x}A_x)(Al_{1-y}B_y)O_3$, wherein "A" represents at least one element selected from the group consisting of barium, strontium and calcium, "B" represents an element selected from the group consisting of magnesium, iron and cobalt, x is a value in a range of 0.10 to 0.30, and y is a value in a range of 0 to 0.30.

14 Claims, 2 Drawing Sheets

(a)

(b)

COMPLEX OXIDES, OXIDE-ION CONDUCTORS, OXIDE-ION CONDUCTING FILMS AND ELECTROCHEMICAL CELLS

This application claims the benefits of Japanese Patent Applications P2001-299268 filed on Sep. 28, 2001, P2001-379657 filed on Dec. 13, 2001 and P2002-220626 filed on Jul. 30, 2002, the entireties of which are incorporated by reference.

BACKGROUND OF THE INVENTION

1. Field of the Invention

The present invention relates to a complex oxide, an oxide-ion conductor, an oxide-ion conducting film and an electrochemical cell.

2. Related Art Statement

It has been tried to apply an oxide-ion conductor to an electrolyte of a solid oxide fuel cell (SOFC), an oxygen sensor and a film for separating oxygen for an electrochemical oxygen pump. Japanese patent publication 11-335, 164A discloses a novel oxide-ion conductor of a complex oxide having perovskite structure and belonging to a rare earth galate system. The claim 1 in the patent publication discloses a complex oxide having a general formula $Ln_{1-x}A_xGa_{1-y-z}B1_yB2_zO_3$ ("Ln" represents La, Ce, Pr or Sm; "A" represents Sr, Ca or Ba; "B1" represents Mg, Al or In; and B2 represents Co, Fe, Ni or Cu). On page 91 of an article entitled "Perovskite-Type Metal Oxides Electrical Conductivity and Structure," Pages 84 to 107 in publication, "R is φ-R-7 9 6 (E N)" it is disclosed that $Sm(Al_{0.95}Mg_{0.05})O_3$ exhibits oxide-ion conductivity.

SUMMARY OF THE INVENTION

An object of the present invention is to provide a novel complex oxide applicable as an oxide-ion conductor, and to provide an electrochemical cell using the complex oxide.

The present invention provides a complex oxide having a basic composition of $(Sm_{1-x}A_x)(Al_{1-y}B_y)O_3$. In the formula, "A" represents one or more element selected from the group consisting of barium, strontium and calcium; "B" represents one or more element selected from the group consisting of magnesium, iron and cobalt; x=0.10 to 0.30; and y=0 to 0.30.

The present invention further provides an oxide-ion conductor comprising the complex oxide, and an electrochemical cell comprising the oxide-ion conductor. The present invention further provides an oxide-ion conducting film comprising the oxide-ion conductor.

The inventors have tried to replace a part of the "A" site (site occupied by Sm) of a complex oxide having a composition of $SmAlO_3$ system and perovskite structure with barium, strontium and/or calcium. As a result, a novel complex oxide has been obtained having a high oxide-ion conductivity. The present invention is based on the findings.

In the present invention, "an oxide-ion conductor" means a substance exhibiting oxide-ion conductivity. The oxide-ion conductor according to the present invention may exhibit oxide-ion conductivity as well as electronic conductivity at the same time.

When a large portion of the total conductivity of the oxide-ion conductor is occupied by electronic conductivity, however, such an ion conductor may not be used for applications in which electromotive force is generated utilizing a gradient of the partial pressure of oxygen. For example, when a solid electrolyte film of a solid oxide fuel cell is formed of such an oxide-ion conductor, the electromotive force is substantially reduced compared with the theoretical value. It is thus preferred to reduce the ratio of electronic conductivity to the total conductivity of the oxide-ion conductor and to improve the ratio of oxide-ion conductivity. From this viewpoint, the transport number of oxide-ion (ratio of oxide-ion conductivity to total conductivity) of the oxide-ion conductor is preferably not lower than 0.70, and more preferably, not lower than 0.90. The oxide-ion conductor according to the present invention generally has a high transport number of oxide-ion, which is preferably not lower than 0.90, and further, preferably not lower than 0.95.

The temperature range for using the oxide-ion conductor according to the present invention is not limited. The temperature range is preferably not lower than 600° C., and more preferably, not lower than 800° C., for improving the oxide-ion conductivity. The oxide-ion conductor is easier to use at a lower temperature in an electrochemical cell or an oxide-ion conducting film. From this viewpoint, the temperature range is preferably not higher than 1000° C.

In the complex oxide according to the present invention, a part of the element occupying the "A" site of the perovskite structure is substituted with one or more elements selected from the group consisting of barium, strontium and calcium. These divalent metal elements substitute a part of the trivalent "A" site so as to exhibit oxide-ion conductivity. Further, when a part of the metal element occupying the "B" site of the perovskite structure is substituted with one or more of magnesium, iron and cobalt, it is considered that the substitutes may also contribute to oxide-ion conductivity.

In the above general formula for the inventive complex oxide, the number of oxygen atoms is represented as three, according to the general nomenclature common in the art. In the complex oxide, however, the number of oxygen atoms actually fluctuates below three. The general formula may thus be represented as follows:

In the formula, δ is the number of vacancy for oxygen. The δ value may fluctuate depending on x and y (the numbers of atoms of the divalent "A" and "B"), as well as the temperature and the oxygen partial pressure. It is thus impossible to strictly define the value of δ. It is a common practice to represent the number of oxygen atoms as "3" in a general formula representing a composition of perovskite structure. The practice is applied in the specification.

In the above formula, "A" represents at least one element selected from the group consisting of barium, strontium and calcium.

The "x" value is a ratio of the substitution of Sm atoms with the element "A," and is preferably not lower than 0.10 and not higher than 0.30. It is possible to improve the oxide-ion conductivity by increasing "x" to a value not lower than 0.10. The "x" value is preferably not lower than 0.15 from this viewpoint. When "x" exceeds 0.30, the atoms of "A" are not doped into the crystal lattice of the perovskite structure to form another crystalline phase. From this viewpoint, "x" is preferably not higher than 0.30.

"B" is at least one element selected from the group consisting of magnesium, iron and cobalt. "B" most preferably contains at least magnesium.

The "y" value is the ratio of substitution of Al atoms with the element "B" and is preferably not higher than 0.30. When "y" exceeds 0.30, the atoms of "B" are not doped into the crystal lattice of the perovskite structure to form another crystalline phase. From this viewpoint, "y" is preferably not higher than 0.30.

The lower limit of "y" is not particularly defined and may be zero. When "y" represents zero, the composition of the complex oxide according to the present invention may be represented as follows:

$(Sm_{1-x}A_x) AlO_3$.

The complex oxide has the basic composition described above. The complex oxide may contain the other metal elements as long as the metal elements do not substantially reduce the oxide-ion conductivity. Such additional metal elements include Cu, Ni, Mn, Ti, V and Cr. The molar ratio of "the other metal element(s)" to all the metal elements in the complex oxide is preferably not higher than 0.1. Further, the complex oxide according to the present invention may contain an inevitable impurity, for example, an inevitable impurity derived from each of the raw materials for each metal element constituting the basic composition.

These and other objects, features and advantages of the invention will be appreciated upon reading the following description of the invention when taken in conjunction with the attached drawings, with the understanding that some modifications, variations and changes of the same could be made by a skilled person in the art.

DETAILED DESCRIPTION OF THE INVENTION

Figure 1:
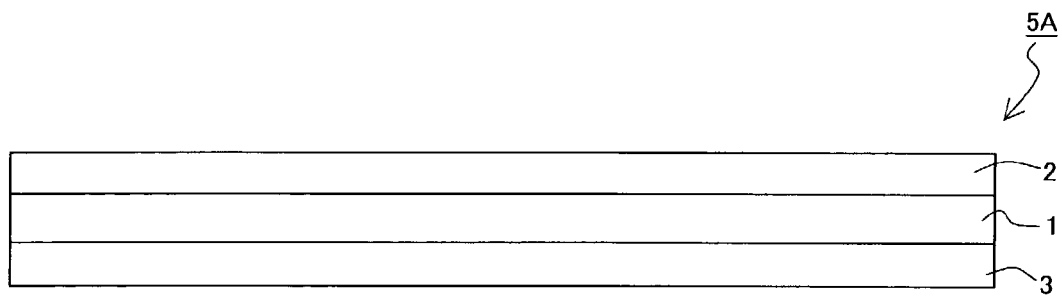
FIG. 1(a) is a diagram schematically showing an electrochemical cell 5A.
FIG. 1(b) is a diagram schematically showing an electrochemical cell 5B.
Figure 1:
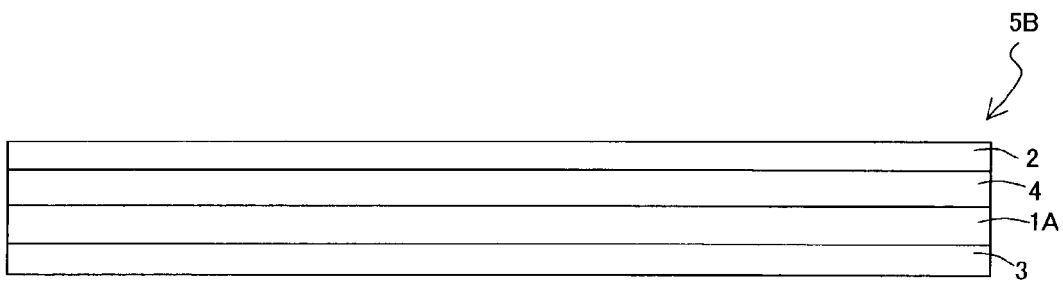

The oxide-ion conductor according to the present invention may be used as an oxide-ion conducting film, and as a material for an oxide-ion conducting portion of an electrochemical cell.

The ion conductor according to the present invention may be used as an oxide-ion conductor in an electrochemical cell, as well as films for permeating oxygen and separating oxygen.

An electrochemical cell targeted by the present invention means a cell for performing an electrochemical reaction. For example, a cell 5A shown in FIG. 1(a) has a first electrode 2, a second electrode 3, and a complex oxide 1 provided between the first and second electrodes 2 and 3.

The electrochemical cell according to the present invention includes the following:

(1) a generator, for example, a solid oxide fuel cell;
(2) An oxygen sensor; and
(3) An electrochemical reactor, for example, an electrochemical oxygen pump, a high temperature vapor electrolyte cell, a hydrogen production cell, a cell for removing vapor, a decomposition cell for $NO_X$ or a decomposition cell for $SO_X$.

In a preferred embodiment, the electrochemical cell according to the present invention has an oxide-ion conducting portion 1 made of the inventive complex oxide, for example as shown in FIG. 1(a). The shape or pattern of the oxide-ion conducting portion 1 is not particularly limited, and may be a plate or a film.

Further, in a preferred embodiment, an oxide-ion conducting portion made of an ion conductor different from the complex oxide of the present invention. In this case, for example as a cell 5B shown in FIG. 1(b), an intermediate layer 4 made of the inventive complex oxide may be provided between an oxide-ion conducting portion 1A and the first electrode 2.

The complex oxide according to the present invention has perovskite structure. The material for an electrode adjacent to the inventive complex oxide is thus preferably a complex oxide having perovskite structure. It is thereby possible to effectively utilize the mixed conductivity of the electrode adjacent to the inventive complex oxide.

From this point of view, a complex oxide having the following composition is preferred for an electrode:

$(D_{1-p}E_p) MO_3$.

In the above formula, "D" represents at least one rare earth element selected from the group consisting of lanthanum, praseodymium, neodymium, samarium and gadolinium; "E" represents at least one alkaline earth element selected from the group consisting of barium, strontium, and calcium; "p" represents 0 to 1.0; and "M" represents at least one metal element selected from the group consisting of iron, cobalt and manganese. The "p" value is preferably 0.1 to 0.8, and more preferably, 0.3 to 0.6.

In a preferred embodiment, "D" represents at least one rare earth element selected from the group consisting of praseodymium, neodymium, samarium and gadolinium, most preferably samarium. An element constituting the complex oxide for the electrode, particularly lanthanum, and samarium in the complex oxide constituting the oxide-ion conducting portion or intermediate layer, may be mutually diffused to form a layer with a high resistance. In the present embodiment, the formation of the layer with a high resistance may be prevented. It is thus possible to reduce the resistance at the interface between the electrode and the oxygen ionic conducting portion or intermediate layer.

In a preferred embodiment, the first electrode is made of a material having the following general formula:

$(Sm_{1-p}E_p) MO_3$.

In the above formula, "E" represents at least one alkaline earth metal element selected from the group consisting of strontium and calcium.

In a particularly preferred embodiment, the first electrode has the following general formula:

$(Sm_{1-p}E_p)(Co_{1-q}B'_q)O_3$.

In the above formula, "E" represents at least one alkaline earth metal element selected from the group consisting of strontium and calcium, "B" represents at least one metal element selected from the group consisting of iron and manganese, and "q" represents 0.0 to 0.8. A part of a complex oxide having the above composition and a mixed conductivity is disclosed in Japanese patent publication 2001-176, 518A.

The material of the second electrode includes the complex oxides described above, as well as nickel, palladium, platinum, nickel-zirconia cermet, platinum-zirconia cermet, palladium-zirconia cermet, nickel-cerium oxide cermet, platinum-cerium oxide cermet, palladium-cerium oxide cermet, ruthenium, and ruthenium-zirconia cermet.

When the complex oxide according to the present invention is produced, for example, a specified composition of powdery raw materials for the metal elements are mixed to obtain a mixture, which is shaped to provide a shaped body. The shaped body is then sintered to provide a sintered body. The shaping step may be omitted in the above process.

Alternatively, powdery raw materials for the metal elements are mixed according to a predetermined composition to obtain a mixture. The mixture is then calcined without shaping to obtain a complex oxide having a desired composition. The complex oxide is then ground to obtain powder, which is then shaped to provide a shaped body for the subsequent sintering.

Alternatively, the shaped body may be subjected to a preliminary firing process at a temperature lower than that for the subsequent sintering process. The preliminary firing process is carried out at a temperature from 500° C. to 1300° C. Preferably, the shaped body is subjected to the preliminary firing process to obtain a calcined body, which is then ground, shaped again and then sintered.

The method of shaping is not limited and includes uniaxial compressing, isostatic pressing, extrusion and tape casting. The sintering process is preferably performed in an oxidizing atmosphere or an inert gas. The raw material may be a compound including an oxide as well as a precursor (for example, a carbonate, an oxalate or a carboxylate) that may be thermally decomposed during a firing step to produce an oxide. The sintering temperature is not limited, and is preferably not lower than 1200° C., and most preferably, not lower than 1300° C. The upper limit of the sintering temperature is not necessarily defined, and is preferably 1700° C. or lower. The time period for the sintering is not limited, and is preferably not shorter than 1 hour, and not longer than 50 hours.

EXAMPLES

Experiment A

Synthesis of a Complex Oxide of Example 1: $Sm_{0.8}Ca_{0.2}AlO_3$

Predetermined amounts of powdery raw materials of $Sm_2O_3$, $CaCO_3$ and $Al_2O_3$ were mixed to provide a mixture, which was then calcined at 1600° C. for 5 hours to synthesize powder of a complex oxide. The thus obtained powder was ground and pressed into a disk, which was then sintered at 1600° C. for 24 hours to obtain a sintered body having a thickness of 2 mm and a diameter of 20 mm. The composition was proved to be $Sm_{0.8}Ca_{0.2}AlO_3$. The thus obtained sintered body was measured by X-ray diffraction analysis to study its crystal structure. It was proved that the complex oxide has perovskite structure.

Synthesis of a Complex Oxide of Example 2: $Sm_{0.9}Sr_{0.1}AlO_3$

Predetermined amounts of powdery raw materials of $Sm_2O_3$, $SrCO_3$ and $Al_2O_3$ were mixed to provide a mixture, which was then calcined at 1600° C. for 5 hours to synthesize powder of a complex oxide. The thus obtained powder was ground and pressed into a disk, which was then sintered at 1600° C. for 24 hours to obtain a sintered body having a thickness of 2 mm and a diameter of 20 mm. The composition was proved to be $Sm_{0.9}Sr_{0.1}AlO_3$. The thus obtained sintered body was measured by X-ray diffraction analysis to study its crystal structure. It was proved that the complex oxide has perovskite structure.

Synthesis of a Complex Oxide of Example 3: $Sm_{0.9}Ca_{0.1}Al_{0.95}Mg_{0.05}O_3$ Predetermined amounts of powdery raw materials of $Sm_2O_3$, $CaCO_3$, $Al_2O_3$ and MgO were mixed to provide a mixture, which was then calcined at 1600° C. for 5 hours to synthesize powder of a complex oxide. The thus obtained powder was ground and pressed into a disk, which was then sintered at 1600° C. for 24 hours to obtain a sintered body having a thickness of 2 mm and a diameter of 20 mm. The composition was proved to be $Sm_{0.9}Ca_{0.1}Al_{0.95}Mg_{0.05}O_3$. The thus obtained sintered body was measured by X-ray diffraction analysis to study its crystal structure. It was proved that the complex oxide has perovskite structure.

Synthesis of a Complex Oxide of Comparative Example 1: $Sm_{0.95}Sr_{0.05}AlO_3$ Predetermined amounts of powdery raw materials of $Sm_2O_3$, $SrCO_3$ and $Al_2O_3$ were mixed to provide a mixture, which was then calcined at 1600° C. for 5 hours to synthesize powder of a complex oxide. The thus obtained powder was ground and pressed into a disk, which was then sintered at 1600° C. for 24 hours to obtain a sintered body having a thickness of 2 mm and a diameter of 20 mm. The composition was proved to be $Sm_{0.95}Sr_{0.05}AlO_3$. The thus obtained sintered body was measured by X-ray diffraction analysis to study its crystal structure. It was proved that the complex oxide has perovskite structure.

Comparison of Electrical Conductivity

A platinum electrode was formed on each side of each of the sintered bodies according to the Examples 1, 2, 3 and Comparative Example 1. The electrical conductivity was measured in air at 800 and 1000° C. for each of the sintered bodies, and the results were shown in Table 1.

TABLE 1

|  |  | Electrical Conductivity (S/cm) | |
| --- | --- | --- | --- |
|  |  | 1000° C. | 800° C. |
| Example 1 | (Sm0.8 Ca0.2) Al03 | 0.12 | 0.037 |
| Example 2 | (Sm0.9 Sr0.1) Al03 | 0.05 | 0.014 |
| Example 3 | (Sm0.9 Ca0.1) (Al0.95 Mg0.05) | 0.06 | 0.021 |
| Comparative Example 1 | (Sm0.95 Sr0.05) Al03 | 0.02 | 0.006 |
| Known Materials | 8YSZ | 0.10 | 0.030 |
|  | 3YSZ | 0.05 | 0.011 |
|  | Sm(Al0.95 Mg0.05)03 | 0.01 | 0.003 |

As shown in Table 1, $Sm_{0.8}Ca_{0.2}AlO_3$ (Example 1) had an oxide-ion conductivity higher than those of 8 YSZ (8 mole percent yttria-stabilized zirconia) and $Sm(Al_{0.95} Mg_{0.05})O_3$ in a temperature range of 800 to 1000° C. $Sm_{0.9}Sr_{0.1}AlO_3$ (Example 2) had an oxide-ion conductivity higher than those of 3 mole percent yttria-stabilized zirconia and $Sm(Al_{0.95} Mg_{0.05})O_3$ in a temperature range of 800 to 1000° C. $Sm_{0.9}Ca_{0.1}Al_{0.95}Mg_{0.05}O_3$ (Example 3) had an oxide-ion conductivity higher than that of 3 mole percent yttria-stabilized zirconia. The electrical conductivity of each of Examples 1, 2 and 3 proved to be considerably higher than that of the sintered body of the Comparative Example 1.

Measurement of Electromotive Force

A platinum electrode was formed on each side of each of the sintered bodies according to Examples 1 and 2. One of the electrodes was contacted with air and the other electrode was contacted with humidified hydrogen gas so that gradient of partial pressure of oxygen gas was provided. The electromotive force was measured for each test piece. The transport number of oxide-ion was evaluated as the ratio of the measured electromotive force to the theoretical value calculated using the Nernst equation for each test piece and shown in Table 2. The value of transport number of oxide-ion was more than 0.90. It was shown that oxide-ion was the dominant carrier contributing to the electrical conductivity of the sintered body.

TABLE 2

|  |  | 1000° C. | 800° C. |
|---|---|---|---|
| Example 1 | (Sm0.9 Sr0.1) AlO3 | 0.95 | 0.91 |
| Example 2 | (Sm0.8 Ca0.2) AlO3 | 0.98 | 0.96 |

Experiment B

A solid oxide fuel cell 5A shown in FIG. 1(*a*) was produced in the following Examples B1 to B4.

In Examples B1 and B2, an oxide-ion conducting portion 1 of $Sm_{0.8}Ca_{0.2}AlO_3$ was produced. Specifically, predetermined amounts of powdery raw materials of $Sm_2O_3$, $CaCO_3$ and $Al_2O_3$ were mixed to provide a mixture, which was then calcined at 1600° C. for 5 hours to synthesize powder of a complex oxide. The thus obtained powder was ground and pressed into a disk, which was then sintered at 1600° C. for 24 hours to obtain a sintered body having a thickness of 0.5 mm and a diameter of 20 mm. The composition was proved to be $Sm_{0.8}Ca_{0.2}AlO_3$. The thus obtained sintered body was measured by X-ray diffraction analysis to study its crystal structure. It was shown that the complex oxide has perovskite structure.

In Example B1, predetermined amounts of powder of $Sm_2O_3$, $SrCO_3$ and $Co_3O_4$ were mixed to provide a mixture, which was then heated at 1200° C. for 5 hours to synthesize a compound. The thus obtained compound was ground to provide powder. Paste containing the powder was then applied onto one side of the oxide-ion conducting portion 1 as the air electrode 2. Platinum paste was applied onto the other side of the ionic conducting portion 1 as the fuel electrode 3. The ionic conducting portion 1 with electrode 2 and 3 was then fired at 1000° C. for 2 hours. The thus obtained air electrode 2 had a composition of $(Sm_{0.5}Sr_{0.5})CoO_3$.

In Example B2, predetermined amounts of powdery raw materials of $La_2O_3$, $CaCO_3$ and $Mn_3O_4$ were mixed to provide a mixture, which was then heated at 1200° C. for 5 hours to synthesize a compound. The thus obtained compound was ground to provide powder. Paste containing the powder was then applied onto one side of the oxide-ion conducting portion 1 as the air electrode 2. Platinum paste was applied onto the other side of the ionic conducting portion 1 as the fuel electrode 3. The ionic conducting portion 1 with electrodes was then fired at 1000° C. for 2 hours. The thus obtained air electrode 2 had a composition of $(La_{0.8}Ca_{0.2})MnO_3$.

In Example B3, an ionic conducting portion 1 made of 3 mole percent yttria-stabilized zirconia was prepared. Predetermined amounts of powdery raw materials of $Sm_2O_3$, $SrCO_3$ and $Co_3O_4$ were mixed to provide a mixture, which was then heated at 1200° C. for 5 hours to synthesize a compound. The thus obtained compound was ground to provide powder. Paste containing the powder was then applied onto one side of the oxide-ion conducting portion 1 as the air electrode. Platinum paste was applied onto the other side of the ionic conducting portion 1 as the fuel electrode. The ionic conducting portion with electrodes was then fired at 1000° C. for 2 hours. The thus obtained air electrode 2 had a composition of $(Sm_{0.5}Sr_{0.5})CoO_3$.

In Example B4, an ionic conducting portion 1 made of 3 mole percent yttria stabilized zirconia was prepared. Predetermined amounts of powdery raw materials of $La_2O_3$, $CaCO_3$ and $Mn_3O_4$ were mixed to provide a mixture, which was then heated at 1200° C. for 5 hours to synthesize a compound. The thus obtained compound was ground to provide powder. Paste containing the powder was then applied onto one side of the oxide-ion conducting portion 1 as the air electrode. Platinum paste was applied onto one side of the ionic conducting portion 1 as the fuel electrode. The ionic conducting portion 1 with electrodes was then fired at 1000° C. for 2 hours. The thus obtained air electrode 2 had a composition of $(La_{0.8}Ca_{0.2})MnO_3$.

Figure 2:
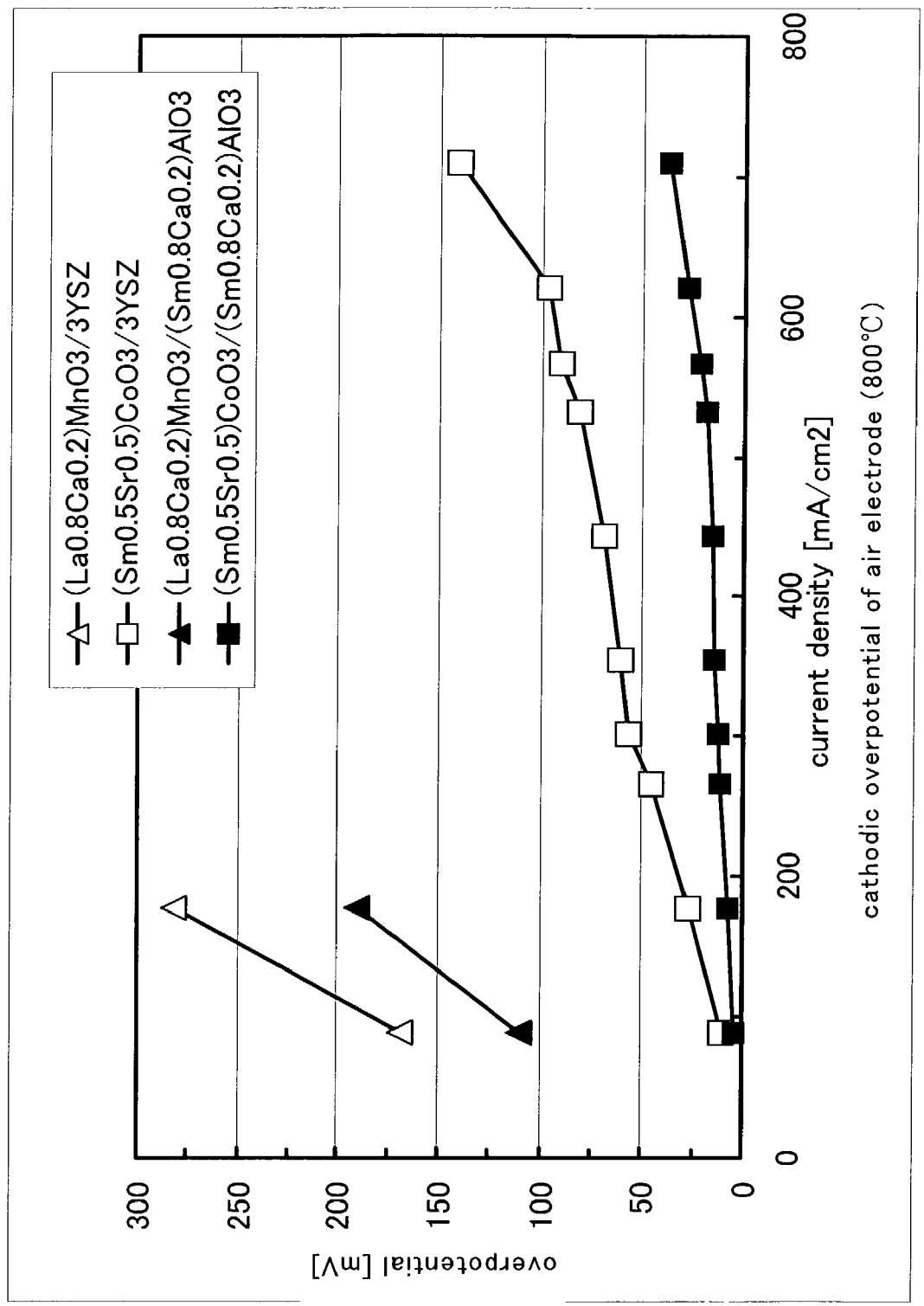
FIG. 2 is a graph showing relationship between current density and cathodic overpotential of an air electrode, for each of the samples according to Examples B1 to B4.

For each of the test pieces according to Examples B1 to B4, the relationship of the cathodic overpotential η of the air electrode 2 and the current density (a value of current per an unit surface area of electrode) was measured, and the results are shown in FIG. 2. The η value was measured with a current interruption method in air at 800° C.

As seen from the results, when the oxide-ion conducting portion 1 made of the inventive complex oxide is used, the η value of the air electrode can be reduced, compared with the case that the ionic conducting portion 1 is made of common 3 mole percent yttria stabilized zirconia. In particular, it was seen that the η value may be considerably reduced by applying an air electrode made of the complex oxide containing Sm with a perovskite structure.

As described above, the present invention provides a novel complex oxide applicable as an oxide ion conductor.

The present invention has been explained referring to the preferred embodiments. However, the present invention is not limited to the illustrated embodiments which are given by way of examples only, and may be carried out in various modes without departing from the scope of the invention.

The invention claimed is:

1. A complex oxide comprising a basic composition of $(Sm_{1-x}A_x)(Al_{1-y}B_y)O_3$;
    wherein "A" represents at least one element selected from the group consisting of barium, strontium and calcium;
    wherein "B" represents at least one element selected from the group consisting of magnesium, iron and cobalt;
    wherein x=0.15 to 0.30; and
    wherein y=0 to 0.30.

2. An electrochemical cell comprising a first electrode, a second electrode and said complex oxide of claim 1, wherein said complex oxide is provided between said first electrode and said second electrode.

3. The electrochemical cell of claim 2, comprising an oxide-ion conducting portion made of said complex oxide.

4. The electrochemical cell of claim 3, wherein said oxide-ion conducting portion has a film shape.

5. The electrochemical cell of claim 2, further comprising an oxide-ion conducting portion made of an ion conductor having a composition that is different from said basic composition of said complex oxide, wherein said complex oxide comprises an intermediate layer provided between said oxide-ion conducting portion and said first electrode.

6. The electrochemical cell of claim 2, wherein said first electrode has a composition of $(D_{1-p}E_p)MO_3$;
wherein "D" represents at least one rare earth element selected from the group consisting of lanthanum, praseodymium, neodymium, samarium and gadolinium;
wherein "E" represents at least one alkaline earth element selected from the group consisting of barium, strontium and calcium;
wherein "p" represents a value in a range of 0 to 1.0; and
wherein "M" represents at least one metal element selected from the group consisting of iron, cobalt and manganese.

7. The electrochemical cell of claim 6, wherein "D" represents samarium, and wherein "E" represents at least one alkaline rare earth element selected from the group consisting of strontium and calcium.

8. The electrochemical cell of claim 7, wherein "M" represents cobalt.

9. An oxide-ion conductor comprising a basic composition of $(Sm_{1-x}A_x)(Al_{1-y}B_y)O_3$;
wherein "A" represents at least one element selected from the group consisting of barium, strontium and calcium;
wherein "B" represents an element selected from the group consisting of magnesium, iron and cobalt;
wherein x=0.15 to 0.30; and
wherein y=0 to 0.30.

10. An ionic conducting film comprising said oxide ion conductor of claim 9.

11. An electrochemical cell comprising a first electrode, a second electrode, an oxide-ion conducting portion and an intermediate layer;
wherein said intermediate layer comprises a complex oxide having a basic composition of $(Sm_{1-x}A_x)(Al_{1-y}B_y)O_3$, wherein "A" represents at least one element selected from the group consisting of barium, strontium and calcium, "B" represents at least one element selected from the group consisting of magnesium, iron and cobalt, x=0.10 to 0.30, and y=0 to 0.30;
wherein said oxide ion conducting portion comprises an ion conductor having a composition that is different from said basic composition of said complex oxide; and
wherein said intermediate layer is provided between said oxide-ion conducting portion and said first electrode.

12. The electrochemical cell of claim 11, wherein said first electrode comprises a $(D_{1-p}E_p)MO_3$ composition;
wherein "D" represents at least one rare earth element selected from the group consisting of lanthanum, praseodymium, neodymium, samarium and gadolinium;
wherein "E" represents at least one alkaline earth element selected from the group consisting of barium, strontium and calcium;
wherein "p" represents 0 to 1.0; and
wherein "M" represents at least one metal element selected from the group consisting of iron, cobalt and manganese.

13. The electrochemical cell of claim 12, wherein "D" represents samarium, and wherein "E" represents one or more alkaline rare earth elements selected from the group consisting of strontium and calcium.

14. The electrochemical cell of claim 13, wherein "M" represents cobalt.

* * * * *